July 7, 1953  N. MILLER  2,644,874
HIGH-TEMPERATURE BIMETAL THERMOSTAT
Filed March 3, 1951  4 Sheets-Sheet 1
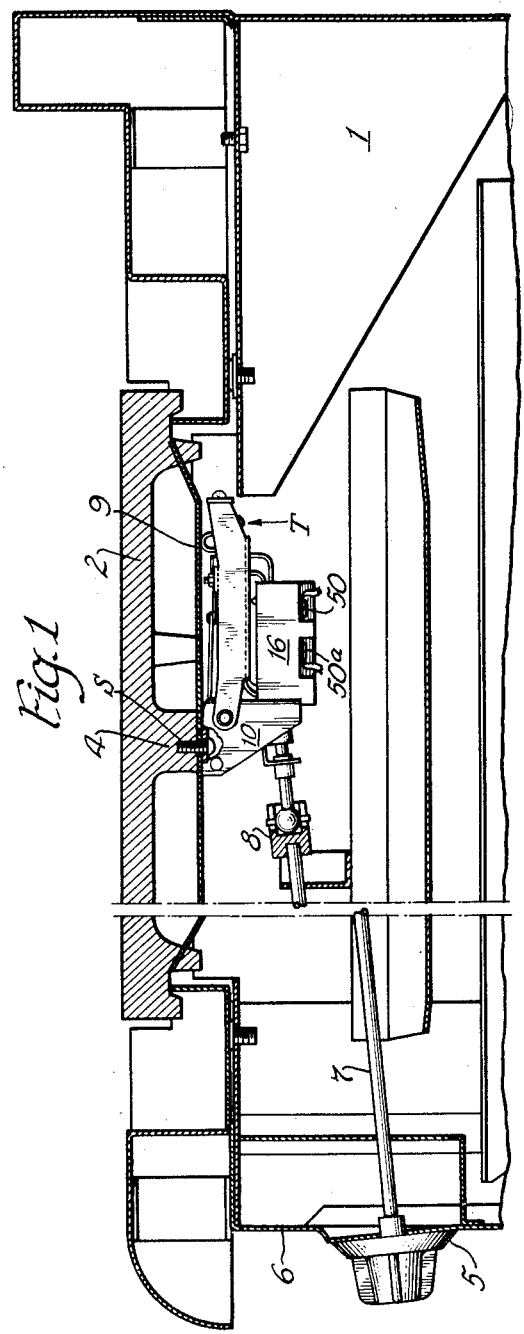
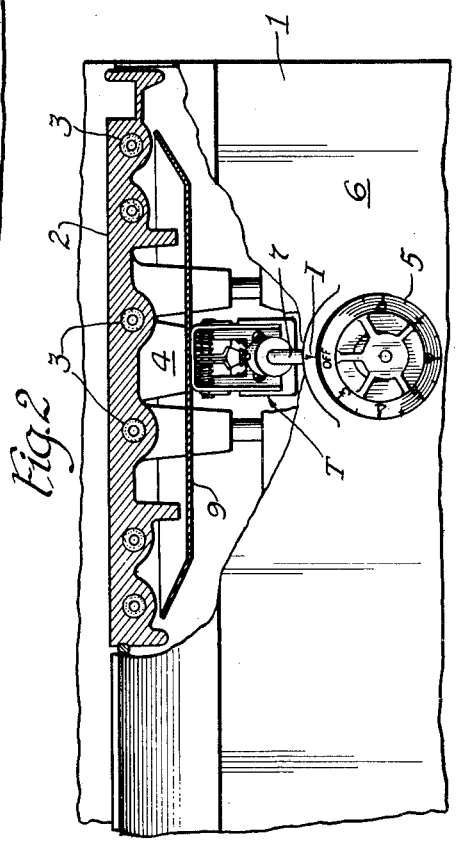
Inventor
Nicholas Miller
by Andrew G. Hubbard
Atty.

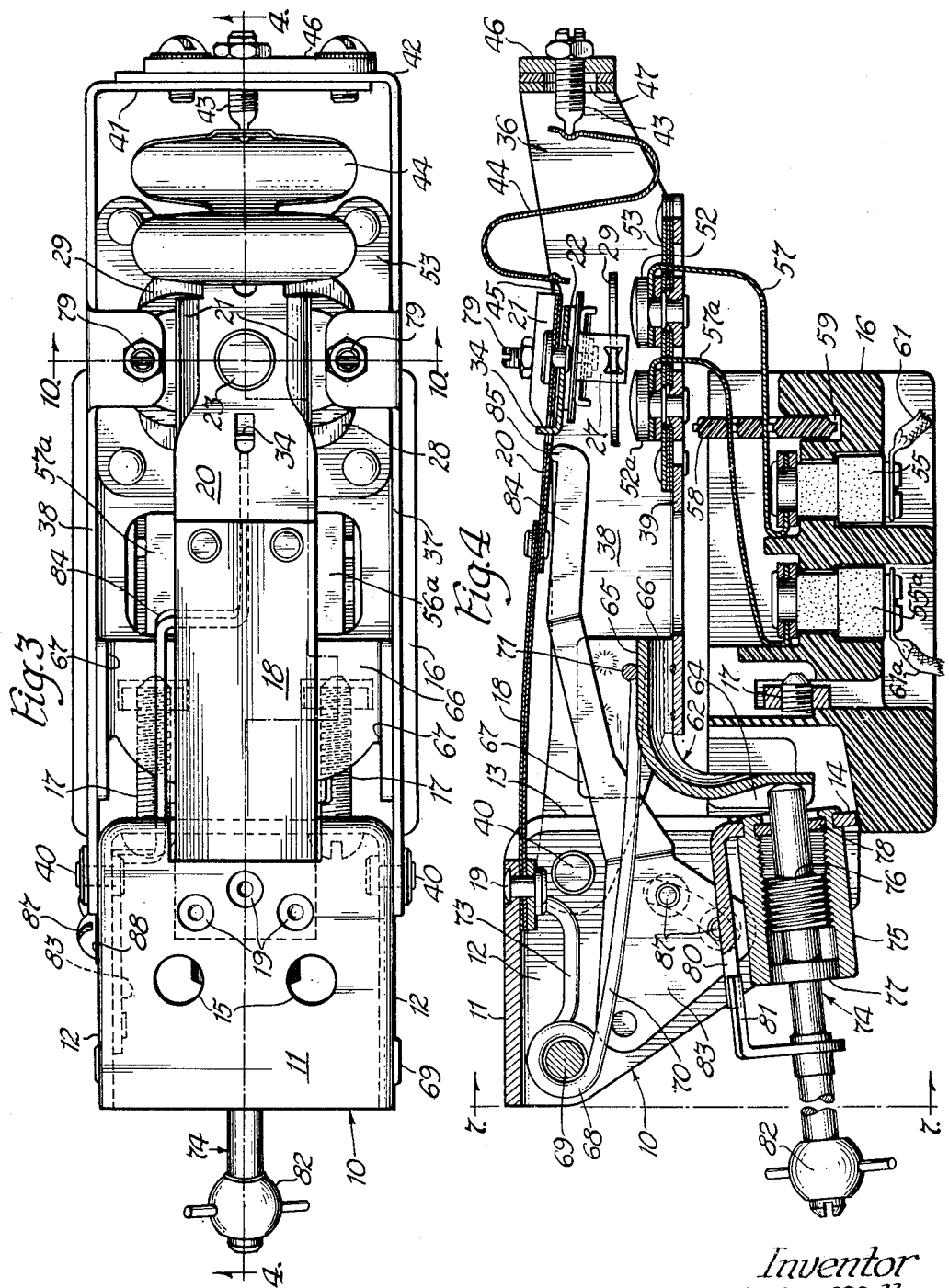

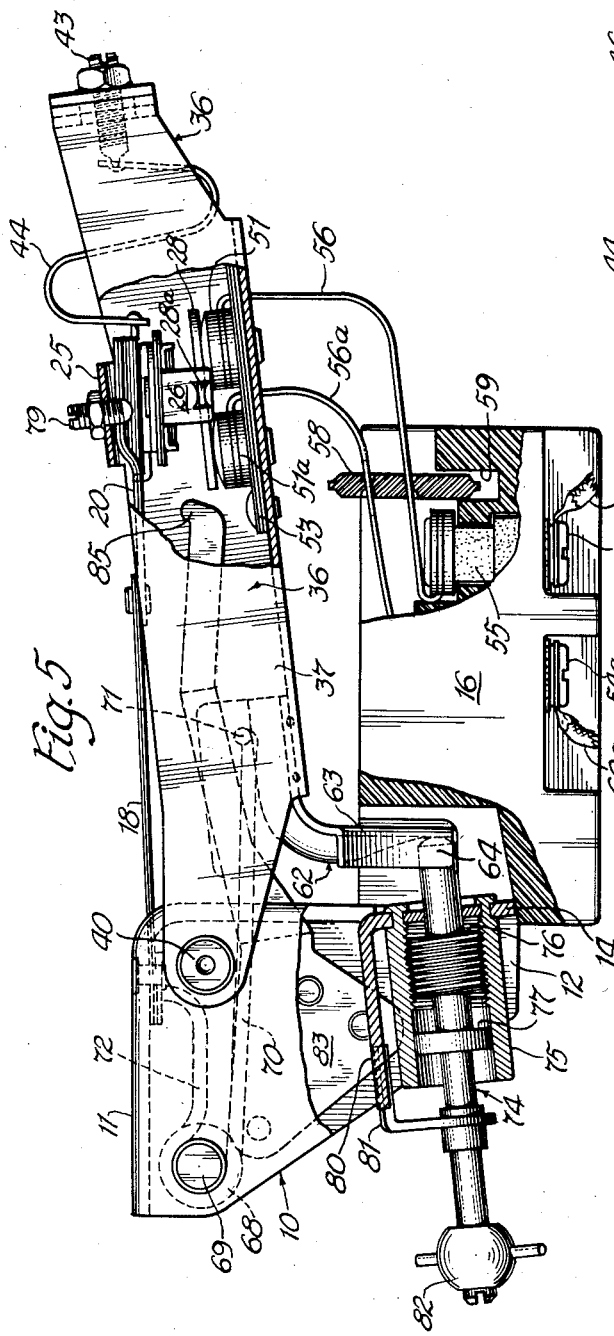

July 7, 1953 N. MILLER 2,644,874
HIGH-TEMPERATURE BIMETAL THERMOSTAT
Filed March 3, 1951 4 Sheets-Sheet 4
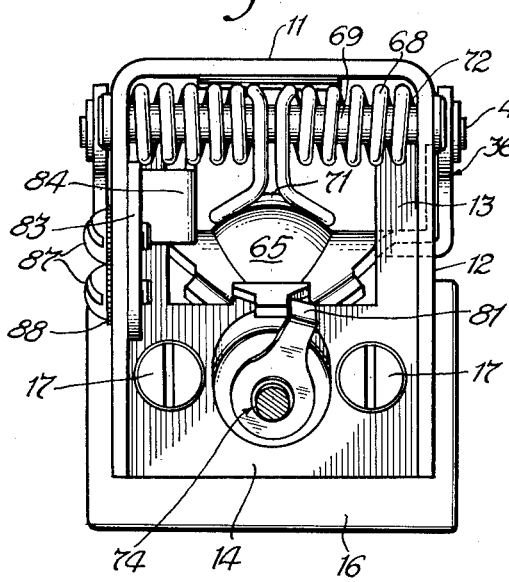
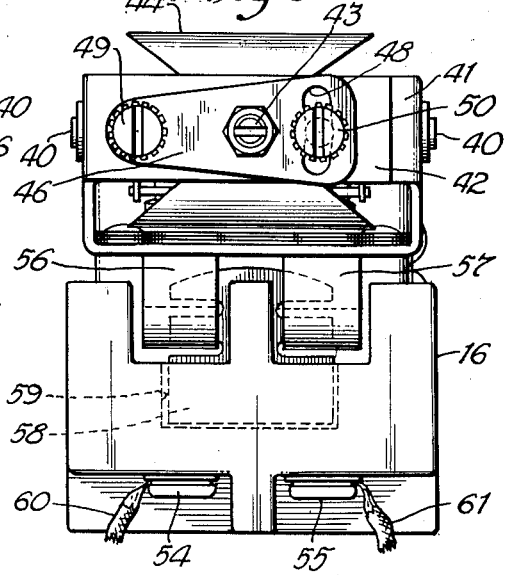
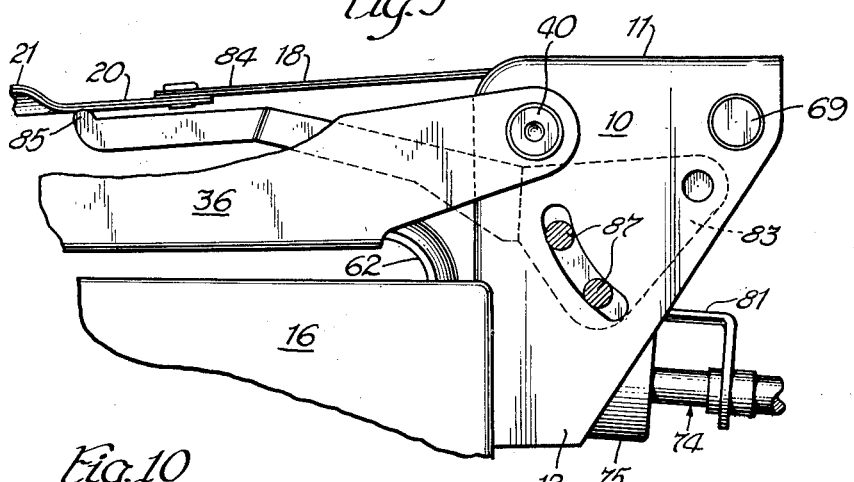
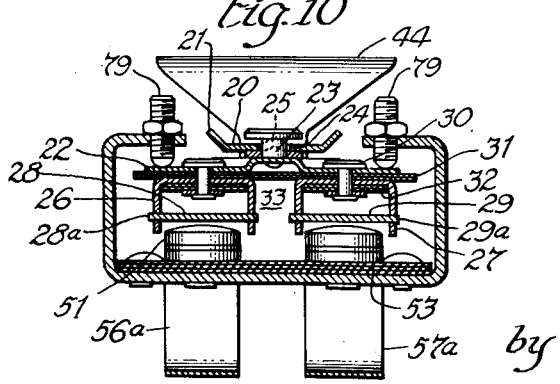
Inventor
Nicholas Miller Patented July 7, 1953

2,644,874

UNITED STATES PATENT OFFICE 2,644,874

HIGH-TEMPERATURE BIMETAL THERMOSTAT

Nicholas Miller, Berwyn, Ill., assignor to General Electric Company, a corporation of New York Application March 3, 1951, Serial No. 213,740

11 Claims. (Cl. 200—138)

This invention relates to temperature responsive control devices, and in particular, to a thermostat of the bimetal type adapted for the control of temperatures ranging up to 1000 degrees F.

Insofar as I am aware, no bimetal thermostat has heretofore been capable of satisfactorily controlling temperatures above 700 degrees F., for various reasons. Bimetals capable of withstanding high temperature stresses without taking a permanent set, have a relatively low order of sensitivity; the amplitude of movement of such material is only about one-half that of the common bimetals whose maximum control range is in the 600 to 700 degree F. zone, and this low-amplitude movement has not been conducive to proper contact separation. Bimetal thermostats are self-contained devices in which the entire structure may be exposed to substantially the temperature of the device being controlled. As a result, their component parts are subject to operating temperatures and other conditions much more severe than conventional liquid or thermal expansion thermostats in which the casing housing the adjustment devices, contacts, and other rather vulnerable elements is not subject to extremely high temperatures. In a bimetal thermostat small differences in co-efficients of thermal expansion of pivotally associated parts may result in a binding or abnormally stiff movement of such parts, and means must be provided for maintaining free movement of such parts at high temperatures while avoiding sloppiness and resulting loss of accuracy at substantially lower temperatures.

It is therefore a principal object of my invention to provide a bimetal type thermostat which will provide temperature control accurate within commercial limits over a range of from 250 degrees F. to 1000 degrees F.

It is another object of my invention to provide means for maintaining the various pivotally associated elements of the thermostat in proper operative relationship throughout the operating temperature range of the device.

It is a further object of my invention to provide a bimetal thermostat in which the relatively low sensitivity of high temperature-responsive bimetals may be adapted to produce low amplitude make-and-break action of the switch contacts controlled thereby.

Still another object of my invention is to provide a high temperature-responsive bimetal thermostat having a yoke member movable with respect to the bimetal element to establish the desired operating temperature, said yoke being biased toward one operating condition by spring means having such operative relation to the rigidity of the bimetal element at high temperature that the bimetal element will not be overstressed under operating conditions in which the spring bias may be transmitted through the yoke to the bimetal.

A further object of my invention is to provide an improved flexible conductor system between the thermostat contact means and binding posts or terminals through which the thermostat is connected into the heating element control circuit.

In a presently preferred embodiment of my invention adapted for the temperature control of electrically heated cook stoves and the like, I secure a bimetal blade to a fixed frame member of which a portion is in direct heat exchange relation contact with the cooking surface of the stove. A pair of contact elements is carried on an extension of the bimetal blade in insulated relation therewith. The end of the extension is knife-edged. I pivotally attach to said frame a rigid yoke having fixed contacts disposed in cooperative arrangement with respect to the contacts on the bimetal member. By placing the bimetal contact structure as near as possible to the knife-edge end of the bimetal extension, and utilizing an S-shaped throw spring between the knife edge and a spring pivot point on the end of the yoke, I am able to attain the desired speed and extent of contact separation even with the low order of response of high-temperature bimetal. An adjusting screw directed against an angularly extending portion of the yoke provides means for rotating the yoke relative to the bimetal for adjustment of the control temperature. To prevent the adjusting screw from binding in its threaded sleeve, the sleeve thread is made oversize, and the shank of the screw is guided in suitable bearings carried by the sleeve. Spring pressure exerted on the end of the adjustment screw maintains the respective threaded elements in proper engagement to insure repetitive action of the spring regardless of the temperature to which the screw is exposed.

The conductors between the contacts and the binding posts to which the leads from the electrical control system are attached, are highly flexible; in a commercial application of my invention, I employ thin strips of silver. These strips are supported intermediate their ends by a floating insulator which permits free flexing of the strips without strain on the contact elements carried by the movable yoke. This is particularly advantageous when the thermostat is directly in the control circuit of a high wattage heating system in which the circuit connections must be of relatively heavy, stiff, wire. It may be mentioned in passing that a thermostat embodying my invention may be used with any heating means capable of electrical control, such as oil, gas, or automatic coal-stoking devices, and is therefore not restricted to electric heating as such.

Means are provided to support the bimetal element against flexing at temperatures below a predetermined minimum. For example, it may be considerd that the lowest operating temperature for a range thermostat may be of the order of 250 degress F. By providing a positive stop which the bimetal element will engage should the temperature drop substantially below that point, and by arranging the adjustment screw and yoke so that the yoke may be rotated to move its fixed contacts safely away from the contacts carried by the bimetal element, a relationship may conveniently be attained in which regardless of how cool the bimetal becomes, the respective contact devices will not come into circuit-closing relationship. The temperature-adjustment knob may suitably be marked with an "off" position which will represent such permanently open state.

Other features and advantages of the invention will be apparent from the following detailed description of a presently preferred embodiment read in connection with the accompanying drawings in which Fig. 1 is a fragmentary side sectional elevation of a restaurant type electric range utilizing a thermostat embodying the present invention; Fig. 2 is a fragmentary front elevation of the range and thermostat, the cooking surface of the range being in section to show typical electric heating elements therein; Fig. 3 is a top plan view of the thermostat; Fig. 4 is a side elevation thereof in section on the line 4—4 of Fig. 3, the thermostat being in the "off" position represented in Fig. 2; Fig. 5 is a side sectional elevation of the thermostat in closed circuit position; Fig. 6 represents the thermostat in open circuit position; Fig. 7 is an end elevation in section along line 7—7 of Fig. 4; Fig. 8 is an opposite end elevation; Fig. 9 is a partial side elevation with a wall of the yoke member broken away to show the limiting arm and indicating a method of adjusting said arm; and Fig. 10 is an elevational section looking in the direction of line 10—10 of Fig. 3.

Although my thermostat is not restricted to such apparatus, it has been illustrated in association with an electric range of the restaurant type in which (see Fig. 1 and Fig. 2) a frame 1 is provided with a cooking surface 2 having embedded therein a suitable plurality of heating elements 3 which are preferably of the familiar sheathed resistance type having an outer metallic sheath within which is contained an electric resistance element embedded in a densely compacted mass of granular material having electrically-insulating and heat-conducting properties. Such heating elements of the type are shown in the C. C. Abbott Patent #1,367,341 dated February 1, 1921. It is of course understood that the heating elements are of relatively high wattage and are served by a suitable electrical circuit (not shown) as well known to those skilled in the art. Rigidly screwed or otherwise secured to a boss 4, extending downwardly from the central area of the cooking surface 2, is a thermostat T embodying the present invention; a temperature-adjustment knob 5 is suitably mounted on a front panel 6 of the range and is operatively associated with the thermostat-adjusting means by a shaft 7 and, where necessary, a universal joint coupling 8. A reflector plate 9 is usually placed below the cooking top to reflect back the heat radiating from the cooking top, thus keeping the space within the range body from rising to excessive temperatures. The temperature-adjustment knob 5 is graduated to indicate thermostat setting points in hundreds of degrees; the illustrated knob has graduations indicating a control range of from 300 to over 900 degrees F. and also has an "off" indicator at which the thermostat will remain in open-circuit position regardless of ambient temperature, as later explained. It should be noted that the knob 5 is rotated in clockwise direction to increase the setting temperature, there being an index mark "I" on the front panel, as is conventional.

Referring now to Figs. 3 and 4, the thermostat T includes a rigid frame structure 10 having a flat-ground top wall 11, side walls 12, and a forward wall 13. Said forward wall is skeletal to provide an opening above a transversely extending bottom portion 14. Holes 15 may be provided in top wall 11 to accommodate the screws 3 (Fig. 1) with which the thermostat is secured to the boss 4 for heat exchange relationship with cooking surface 2. A ceramic terminal block 16 may be secured to forward wall 13 by machine screws or equivalent 17.

A composite bimetal element includes a first bimetal strip 18, one end of which is securely fixed to wall 11 by countersunk rivets 19, and a second bimetal strip 20 riveted to the free end of strip 18. It will be noted that the larger portion of strip 20 is stiffened against flexure by the side wall flanges 21, thus restricting the flexure of the strip to the flat area adjacent strip 18. For reasons well known to those skilled in the art, the respective strips 18 and 20 are arranged so that they have an opposite response to temperature change. That is, where strip 18 flexes downwardly of Fig. 3 upon decrease in temperature, strip 20 flexes upwardly, and vice versa. Each of the said strips 18 and 20 is preferably of a bimetal material made of high chromium alloy components which withstand stresses at high temperatures without taking a permanent set. The bimetal manufactured by the W. M. Chace Company of Detroit, Mich., and known as their #4000 bimetal, has been found satisfactory for control temperatures up to 1000 degrees F.

As has been previously noted, high temperature bimetals of the type mentioned have a very low order of amplitude of movement for temperature change, and I therefore arrange the contact structure as close as is practicable to the end of the bimetal strip. Pursuant to known practices, I arrange the contact assembly for a rather free swivel action. For example, I suspend a light metal crosspiece 22 from the strip 20 by means of a large-headed rivet 23 which passes through a large diameter opening 24 in said strip. The rivet head rests upon a rib 25 formed in said strip. Symmetrically arranged relative to rib 25, are the inverted channel brackets 26, 27, the respective side walls of which are pierced (see Figs. 5 and 6) to receive the contact plates 28, 29, which are formed intermediate their ends with ears 28a, 29a, which extend through the side wall openings of the associated channel brackets. As clearly appears in Fig. 6, the side wall openings of the channel brackets provide for a fairly free rocking action of the contact plates. The channel brackets are insulatedly secured to the crosspiece by rivets 30 in association with the mica or other high-temperature resistant insulator sheets 31, 32. The entire bimetal element contact assembly, hereinafter identified by 33, is held against rotation in the plane of strip 20 by a tongue 34 extending from crosspiece 22 and passing with moderate clearance through an opening provided in said strip (see Fig. 3).

Adjustment or preselection of the temperature at which the thermostat is to exercise control is accomplished by establishing a predetermined relationship between contact assembly 33 and a set of fixed contacts 35 on a yoke member 36 pivotally supported on frame 10 and arranged to be rotated relative thereto, as later described. Said yoke may be a unitary structure having side members 37, 38, rising from a bottom 39. Rivets 40 may be used to pivotally affix the yoke sides to the side walls of frame 10. The ends 41, 42, of the yoke side members overlap to provide a rigid wall on which to mount a pivot screw 43 for the S-shaped overthrow spring 44, the opposite end of said spring being formed (see Fig. 4) to receive the knife-edge end 45 of bimetal strip 20. The side walls of the yoke 36 have a rather free pivotal play in their relationship with the frame member 10 so as to minimize the possibility of binding at elevated temperatures. As will later appear, the temperature adjustment means is so designed that more than usual freedom of play of the respective pivotally mounted members may be utilized without detriment to the accuracy or arrangement of the thermostat. The yoke end portions are preferably welded together and adjustably carry a mounting plate 46 for the spring pivot screw 43, said screw passing through an enlarged opening 47 in the yoke end walls. As best appears in Fig. 8, the pivot screw mounting plate 46 has an arcuate slot 48 which permits rotational adjustment in the plane of the ends of the yoke. The screws 49, 50, are respectively for pivotally mounting the plate 46 and for holding the same in adjusted position. It should be noted in passing that the end of the yoke is parallel to the axis of rotation of the yoke about its pivots, and is at right angles to the longitudinal axis of the bimetal system. The tip of screw 43 will be within acceptable tolerances in the vertical plane of said longitudinal axis throughout the range of adjustment of the support plate. Fixed contact assembly 35 comprises pairs of silver-faced contacts 51, 51a, and 52, 52a, respectively cooperating with the contact plates 28 and 29 in a double pole, single throw, switch arrangement. The contacts are riveted to a relatively heavy body 53 of mica, or the like, which is in turn riveted or otherwise secured to the face of the yoke. Pairs of terminal posts 54, 54a, and 55, 55a, are provided in polygonal apertures in the terminal block 16, and are connected with the respective contact pairs by flexible conductor strips 56, 56a, and 57, 57a. I have found that strips of silver 0.010 inch thick and approximately ⅜ of an inch wide have ample electrical capacity and are sufficiently flexible to permit movement of the yoke as presently described. The conductor strips are maintained in spaced insulated relationship by passage between the various arm members of an insulator 58 which is arranged for "floating" movement in suitable slots 59 provided in the terminal block 16. This arrangement is clearly apparent in Figs. 5 and 8. This electrical connection system is of appreciable importance in the present invention where the load to be controlled is of such high wattage as to require heavy lead wires 60, 60a and 61, 61a, for connection of the thermostat into the load circuit. It should be noted that the terminal posts themselves are relatively loosely mounted in the ceramic insulator 16, having both vertical and lateral clearance with the walls thereof, as appears in Fig. 4. The clearance permits expansion of the terminal posts up to the extreme high temperature of control without imposing strains on the ceramic insulator block. To prevent rotation of the terminal posts within the apertures, the cross section of the posts is similar to that of the apertures.

Affixed to the floor of the yoke is a bell crank member 62 having a leg 63 extending downwardly from the yoke to position its end remote from the yoke pivots. The bell crank is formed as an individual part so that it may be made extremely rigid. Leg 63 is deeply channeled—see flanges 64—and the portion of the leg immediately above the extremity engaged by the temperature adjustment screw is formed with a rib which merges into the relatively high dome 65, rising from the center of the upper leg portion 66, which in turn has side wall flanges 67 engaging the side walls of the yoke. The bell crank leg portion 66 is preferably spot welded at several points to the floor and side walls of the yoke. Dome 65 provides a seat for the end of a torsion spring 68 coiled about a supporting bar 69 extending within the frame member 10. As is apparent from Fig. 7, the spring 68 is wound outwardly from a long double leg portion 70, the bight 71 of which is splayed so as to exert pressure over a symmetrical area which reduces the probability of eccentrically stressing the yoke. The respective spring ends 72, 73, reach forwardly and upwardly to engage the underside of top plate 11. It is obvious that the spring 68 urges the yoke into clockwise rotation, as viewed in Fig. 4. The wide area of contact of the spring portion 70 with the dome 65 and the end thrust exerted on the yoke by the overthrow springs 44 serves to take up the slight clearance at the pivots 46 and insure against possible sloppiness of operation at low temperatures.

To adjust the control temperature at which the thermostat is to operate, I provide an adjustment screw 74 operating within a threaded sleeve 75 fixed rigidly at its end to the bottom portion 14 of the front frame wall. Said bottom portion may be inclined from the vertical as required to cause the shaft screw 74 to be substantially aligned with the shaft 7 extending from the adjustment knob. In order to prevent the threads 76 on screw 74 from binding with those of sleeve 75 at high temperatures, I provide for an appreciable radial clearance between the said threads and support the screw shaft by the respective bearing members 77, 78. The bearing 78 may be fixed within the sleeve, as shown in Fig. 4, and the bearing member 77 formed integral with the screw shaft. These bearings accurately center the screw within the sleeve. The bias of spring 68 urges the bell crank leg 63 against the rounded end of the screw shaft and maintains the respective screw threads in surface contact. The spaced bearings prevent wobbling of the screw shaft at low temperatures even though the bearings may have liberal clearances. The function of the threaded portions becomes merely that of converting rotational movement into axial movement of the screw shaft, changing the position of the yoke relative to the movable contacts according to the direction of rotation of the screw. In actual practice in a thermostat having a control range up to 1000 degrees F., the maximum contact displacement is about 1/16 of an inch. The maximum rise of the bimetal contact assembly 33 relative to the fixed contact assembly 35 at the floor of the yoke may be established by the adjustment screws 79 arranged on inwardly extending portions of the yoke side walls, as is apparent in Figs. 3 and 10. Considering the multiplication of movement afforded by the pivoted yoke, it will be apparent that the angular rotation of leg 63 is but a small fraction of the contact displacement. This emphasizes the need for rigidity of the bell crank structure because any flexure of the leg portion 63 would obviously disturb the calibration of the thermostat.

A tongue 80 struck rearwardly from the frame wall acts as a stop in cooperation with a finger 81 carried by the screw shaft. A ball and pin arrangement 82 fixed to the end of the screw shaft is provided for cooperation with the universal joint coupling of the shaft 7.

It is, of course, obvious that the position of the yoke contacts relative to the movable contacts establishes the approximate control temperature. The spring pivot screw 43 moving with the yoke and therefore having a fixed relation to the contact plane of the yoke contact pairs insures a uniform action of the snap spring 44 in either direction. As is well known, spring 44 snaps or overthrows as the knife edge 45 passes through the plane of the pivot screw tip.

The thermostat may be used as an on-off switch by providing a stop member which will support the bimetal strip contact assembly 33 out of contact with yoke contacts 35 when the yoke is operated to a position representative of a temperature below the lowest control temperature. For example, the instant embodiment provides control over a range of from 250 degrees F. to above 900 degrees F. and the yoke may be rotated downwardly to a position representative of 100 degrees F. or less. Therefore, by restraining movement of the bimetal element so that it cannot follow the yoke to the lower extreme of movement, I can establish a position at which the contacts 33 and 35 will not close regardless of how low the ambient temperature may go. This, of course, has been done in other thermostats, but insofar as I am aware without providing the facility of adjustment and positive action provided herein.

As shown in Figs. 4 and 9, I pivotally attach to the inner face of a frame side wall 12, a stop member having a relatively large area, triangular, plate 83 in surface contact with the frame wall and an extending arm portion 84 which reaches angularly outwardly and forwardly from plate 83 to position a nose 85 in the central portion of the bimetal strip 20 at the forward extremity of the flexible portion thereof. It is understood, of course, that the stop plate and arm are of sufficiently heavy stock to adequately resist the forces which may be exerted against it as the bimetal element responds to a low ambient temperature condition. By reaching forwardly to the outer extremity of the flexible portion of bimetal 20, it is apparent that the separation of the respective contacts will be maintained without undue strain on the bimetal system or the stop member, for when bimetal 20 cools it deflects upwardly in opposition to the downward deflection of bimetal 18.

For adjustment of the stop member to the desired off-point temperature, there is provided an arcuate slot 86 in the frame wall which accommodates a pair of screws 87 which enter tapped openings in plate 83. Suitable lock washers 88 between the screw heads and the frame wall provide means for securely holding the stop plate 83 against displacement from a preset position. The large frictional area of contact between the plate 83 and the frame wall contributes to the stability of the stop member. Rotation of dial 5, Fig. 2, to bring the off-point marking of the dial in registry with index I brings the yoke 36 to its Fig. 4 position, which is well below the lowest control temperature. The contacts remain open regardless of the ambient temperature to which the bimetal element is exposed, because the bimetal is restrained from reaching the yoke contacts in their off-point position.

A condition may frequently arise when the bimetal element will be exposed to the biasing effort of the spring 70 when the bimetal is at high temperature and most susceptible to damage. For example, if the range had been operating under a high temperature setting immediately before being shut down by turning the thermostat to "off" position, the bimetal element would have the upward deflection characteristic of high temperature, as suggested in Fig. 6. The retraction of adjustment spindle 74 from leg 64 releases the yoke for rotation clockwise of Fig. 6, and the yoke would so rotate until its adjustment screws 79 engaged the upper element of contact assembly 33. This yoke movement would be sufficient to open the control circuit, but nevertheless the yoke would be hung up on the bimetal, which would then be exposed to the bias of the spring. At elevated temperatures bimetal elements are structurally weak and could be given a permanent, damaging set by an unduly heavy spring bias. I consider a suitable spring to be one which will enforce rotation of the yoke but under operative conditions in the upper zone of the temperature range of the thermostat will not stress the bimetal beyond its elastic limit at said elevated temperature.

As the bimetal temperature drops and the element moves toward a concave shape, the yoke drops also; so there is no possibility of an accidental closure of the control circuit. Eventually, the movement of the bimetal will be interrupted by engagement with the nose 85. It will be noted that under this latter condition, the stop member supports the bimetal closely adjacent the point at which the spring bias is most effective, and there is no danger that the bias will lose its calibration or take a permanent set due to spring bias, even though the thermostat may be in the "off" position for a long period.

While there has been described what is at present considered to be the preferred embodiment of the invention, it will be understood that various modifications may be made therein, and it is intended to cover in the appended claims all such modifications as fall within the true spirit and scope of the invention.

I claim:

1. A thermostat of the bimetal type responsive to the temperature of a body heated by electrically controllable heating means, comprising a frame having a heat-conducting wall adapted to be secured to said body in heat exchange relation therewith, a heat-responsive element comprising a first bimetal strip fixed at one end to and extending from said wall, and a second bimetal strip fixed to and extending from the free end of said first strip, said strips flexing in opposition in response to temperature change, said second strip being stiffened at its outer portion to limit flexure to a relatively small portion thereof adjacent said first strip, contact means insulatedly carried by said second strip adjacent the free end thereof, a yoke member pivotally affixed to the frame and extending therefrom to enclose said heat-responsive element, the planes of movement of said yoke member and said heat-responsive element being co-incident, snap spring means interposed between said yoke and the free end of said second strip, contact means carried by said yoke member for cooperation with said first contact means, a bell crank fixed to said yoke member and having a leg extending angularly therefrom in the plane of rotation of said member, a female-threaded sleeve fixed to said frame and extending angularly with respect to said bell crank leg, a male-threaded yoke-adjustment spindle associated with said sleeve for engagement with said bell crank leg, there being substantial radial clearance between the respective threads of said sleeve and said spindle in axial alignment within said sleeve, spring means interposed between said frame and said yoke member to enforce rotation of the latter to bring the bell crank leg into engagement with said spindle, whereby upon rotation of said spindle in one or another direction the yoke member will rotate relative to said heat-responsive element to adjust the relative position of the respective contact means, a stop member fixed to said frame and engageable with the second bimetal strip to interrupt movement of said bimetal element toward said yoke member contacts to maintain an open circuit position at a predetermined low temperature of said heat-responsive element, a terminal block fixed to said frame, electric terminal means slidably disposed in said block and corresponding in number with said yoke member contact means, flexible conductors interconnecting said contact means and said terminal means, insulator means floatingly carried by said terminal block supporting each said flexible conductor to maintain the same in spaced relationship one with the other throughout the full range of yoke member adjustment, and means accessible remote from the frame member to effect rotation of said adjustment spindle.

2. A high temperature responsive thermostat of the bimetal type comprising a frame having a heat-conducting wall, a heat-responsive element comprising a first bimetal strip fixed at one end to and extending from said wall member and a second bimetal strip fixed to and extending from the free end of said first strip, said strips flexing in opposition in response to temperature change, said second strip being stiffened at its outer portion to limit flexure to a relatively small portion thereof adjacent said first strip, contact means insulatedly carried by said second strip adjacent the free end thereof, a yoke member pivotally affixed to the frame and extending therefrom to enclose said heat-responsive element, the planes of movement of said yoke member and said heat-responsive element being coincident, contact means carried by said yoke member for cooperation with said first contact means, a bell crank fixed to said yoke member and having a leg extending angularly therefrom in the plane of rotation of said member, a female-threaded sleeve fixed to said frame and extending angularly with respect to said bell crank leg, a male-threaded yoke-adjustment spindle associated with said sleeve for engagement with said bell crank leg, there being substantial radial clearance between the respective threads of said sleeeve and said spindle, bearing means for maintaining said spindle in axial alignment within said sleeve, spring means interposed between said frame and said yoke member to enforce rotation of the latter to bring the bell crank leg into engagement with said spindle, whereby upon rotation of said spindle in one or another direction the yoke member will rotate relative to said heat-responsive element to adjust the relative position of the respective contact means, a terminal block fixed to said frame, electric terminal means relatively loosely disposed in said block and corresponding in number with said yoke member contact means, flexible conductors interconnecting said contact means and said terminal means, insulator means floatingly carried by said terminal block supporting each said flexible conductor to maintain the same in spaced relationship one with the other throughout the full range of yoke member adjustment, and means accessible remote from the frame member to effect rotation of said adjustment spindle.

3. A high temperature responsive thermostat of the bimetal type having a frame, a bimetal element fixed at one end to said frame and extending therefrom, contact means insulatedly carried by said bimetal element adjacent the free end thereof, a yoke pivotally affixed to said frame and extending therefrom parallel to said bimetal element, contact means carried by said yoke for cooperation with said first contact means, and temperature adjustment means comprising a rigid leg member extending angularly from said yoke in the plane of rotation thereof, a female-threaded sleeve fixed to said frame and extending outwardly from said leg member in the plane of rotation thereof, a cooperatively male-threaded adjustment spindle disposed within said sleeve in alignment with said leg member, there being a substantial radial clearance between the respective threads of said sleeve and spindle, bearing means for maintaining the co-axial relation of said spindle and said sleeve, and spring means exerting pressure on said yoke over a relatively wide contact area symmetrical thereof to rotate the yoke to maintain said leg member in pressure engagement with said spindle whereby said spindle is axially displaced within said sleeve to maintain the respective screw threads in facial contact.

4. A high temperature responsive thermostat of the bimetal type comprising a frame, a bimetal element fixed at one end to said frame and extending therefrom, contact means insulatedly carried by said bimetal element adjacent the free end thereof, a yoke pivotally affixed to said frame and extending therefrom parallel to said bimetal element, contact means carried by said yoke for cooperation with said first contact means, spring means interposed between said yoke and said bimetal element, temperature adjustment means comprising a rigid leg member extending angularly from said yoke in the plane of rotation thereof, a female-threaded sleeve fixed to said frame and extending outwardly from said leg member in the plane of rotation thereof, a cooperatively male threaded adjustment spindle disposed within said sleeve in alignment with said leg member, there being a substantial radial clearance between the respective threads of said sleeve and spindle, bearing means for maintaining the co-axial relation of said spindle and said sleeve, spring means exerting pressure on said yoke to rotate the yoke to maintain said leg member in pressure engagement with said spindle whereby said yoke will rotate relative to said frame in a direction according to the direction of rotation of said spindle, and a rigid member fixed to said frame and engageable with said bimetal element adjacent the contact means thereof to prevent engagement of the respective contact means when said yoke is rotated in one direction to a predetermined position.

5. A high temperature responsive thermostat of the bimetal type comprising a frame, a bimetal element fixed at one end to said frame and extending therefrom, contact means insulatedly carried by said bimetal element adjacent the free end thereof, a yoke pivotally affixed to said frame and extending therefrom parallel to said bimetal element, contact means carried by said yoke for cooperation with said first contact means, spring means interposed between said yoke and said bimetal element, temperature adjustment means comprising a rigid leg member extending angularly from said yoke in the plane of rotation thereof, a female-threaded sleeve fixed to said frame and extending outwardly from said leg member in the plane of rotation thereof, a cooperatively male-threaded adjustment spindle disposed within said sleeve in alignment with said leg member, bearing means for maintaining the co-axial relation of said spindle and said sleeve, spring means to rotate the yoke to maintain said leg member in pressure engagement with said spindle whereby said yoke will rotate relative to said frame in a direction according to the direction of rotation of said spindle, and a rigid member adjustably fixed to said frame and engageable with the bimetal element adjacent the contact means thereof to prevent engagement of the respective contact means when said yoke is rotated in one direction to a predetermined position.

6. A high temperature thermostat of the bimetal type comprising a frame, a temperature-responsive bimetal element carried thereby, a yoke pivotally mounted on said frame for movement relative to said temperature-responsive element, contact means respectively carried by said temperature-responsive element and said yoke, a terminal block of insulation material fixed to said frame, terminal means disposed within said terminal block, there being substantial clearance between said terminal means and said block, flexible conductors between said yoke contact means and said terminal means, insulation means freely slidable within said terminal block and engaging said conductors to support the same intermediate said yoke and said terminal block, and means for rotating said yoke relative to said frame comprising a threaded member fixed to said frame, a cooperatively threaded member fixed to said frame, a cooperatively threaded member co-axially associated therewith for engagement with said yoke member, there being substantial radial clearance between the respective threads, means for maintaining said threaded elements in co-axial relationship, and spring means displacing one of said threaded elements axially with respect to the other to maintain the threads thereof in surface contact.

7. A high temperature thermostat comprising a frame, a temperature-responsive element carried thereby, a yoke pivotally mounted on said frame for movement relative to said temperature-responsive element, contact means respectively carried by said temperature-responsive element and said yoke, a terminal block of insulation material fixed to said frame, said block having polygonal apertures therein, terminal means disposed within said terminal block apertures, said terminal means having a polygonal cross section similar to that of said apertures and there being substantial clearance between the respective walls of said terminal means and said block apertures, flexible conductors between said yoke contact means and said terminal means, insulation means slidably supported by said terminal block and engaging said conductors to support the same intermediate said yoke and said terminal block, and means for rotating said yoke relative to said frame for adjusting the position of the respective contacts relative to each other.

8. In a high temperature responsive thermostat of the bimetal type having a frame, a bimetal element fixed at one end to said frame and extending therefrom, contact means insulatedly carried by said bimetal element adjacent the free end thereof, a yoke pivotally affixed to said frame and extending therefrom parallel to said bimetal element, contact means carried by said yoke for cooperation with said first contact means, and spring means interposed between said yoke and said bimetal element: temperature adjustment means comprising a rigid leg member extending angularly from said yoke in the plane of rotation thereof, a female-threaded sleeve fixed to said frame and extending angularly with respect to said leg member, a cooperatively male-threaded adjustment spindle disposed within said sleeve in alignment with said leg member, there being a substantial radial clearance between the respective threads of said sleeve and spindle, bearing means for maintaining the co-axial relation of said spindle and said sleeve, and spring means exerting pressure on said yoke over a relatively wide contact area symmetrical thereof to rotate the yoke to maintain said leg member in pressure engagement with said spindle whereby said spindle is axially displaced within said sleeve to maintain the respective screw threads in facial contact.

9. In a high temperature responsive thermostat of the bimetal type including a frame having a heat-conducting wall, a bimetal member fixed at one end to and extending from said wall member, contact means insulatedly carried by said bimetal member adjacent the free end thereof, a yoke member pivotally affixed to the frame and extending therefrom to enclose said heat-responsive element, the planes of movement of said yoke member and said bimetal member being coincident, and contact means carried by said yoke member for cooperation with said first contact means; temperature-adjustment means comprising a bell crank fixed to said yoke member and having a leg extending angularly therefrom in the plane of rotation of said member, a female-threaded sleeve fixed to said frame and extending angularly with respect to said bell crank leg, a male-threaded yoke-adjustment spindle associated with said sleeve for engagement with said bell crank leg, there being substantial radial clearance between the respective threads of said sleeve and said spindle, bearing means for maintaining said spindle co-axial with respect to said sleeve, spring means interposed between said frame and said yoke member to enforce rotation of the latter to bring the bell crank leg into engagement with said spindle and urge adjacent faces of the respective threads into contact whereby upon rotation of said spindle in one or another direction the yoke member will rotate relative to said heat-responsive element to adjust the relative position of the respective contact means, and means accessible remote from said frame for rotating said adjustment spindle.

10. A bimetallic thermostat comprising a frame, a thermo-sensitive bimetal system having a predetermined temperature range of operation, said system including a bimetal element fixed at one end to the frame and extending therefrom in cantilever fashion and contact means carried by said element near the free end thereof, a yoke structure pivotally mounted in said frame and extending parallel to said bimetal element for rotation in the plane of action thereof, contact means carried by said yoke structure for cooperation with said first-named contact means, stop means fixed to said yoke and engageable with an element of said bimetal system to limit relative movement therebetween, spring means interposed between said yoke and said frame and biasing said yoke into rotation in a direction which engages said stop means with said bimetal system, and adjustment screw means carried by said frame remote from said spring means, said screw means being effective upon rotation in one direction to rotate said yoke structure in a direction opposing said spring bias, and withdrawing from said yoke structure upon rotation in the opposite direction, whereby the maximum effort which the spring means is capable of exerting on said bimetal system upon contact of said stop means with said element thereof is independent of the extent of withdrawal of said adjustment screw means from said yoke structure.

11. A bimetal thermostat as in claim 10, including a rigid stop member extending from said frame to a point adjacent the points of engagement of said stop means with said bimetal system element but on the opposite side thereof, whereby to limit the extent of rotation of said yoke structure induced by said spring means.

NICHOLAS MILLER.

References Cited in the file of this patent

UNITED STATES PATENTS

| Number | Name | Date |
|---|---|---|
| 2,061,419 | Ettinger et al. | Nov. 17, 1936 |
| 2,194,999 | Clark | Mar. 26, 1940 |
| 2,258,258 | Mikeska | Oct. 7, 1941 |